July 14, 1959     H. C. KNARZER     2,894,761
QUICK ADJUSTMENT MEANS FOR ROTARY LAWN MOWERS
Filed March 25, 1957
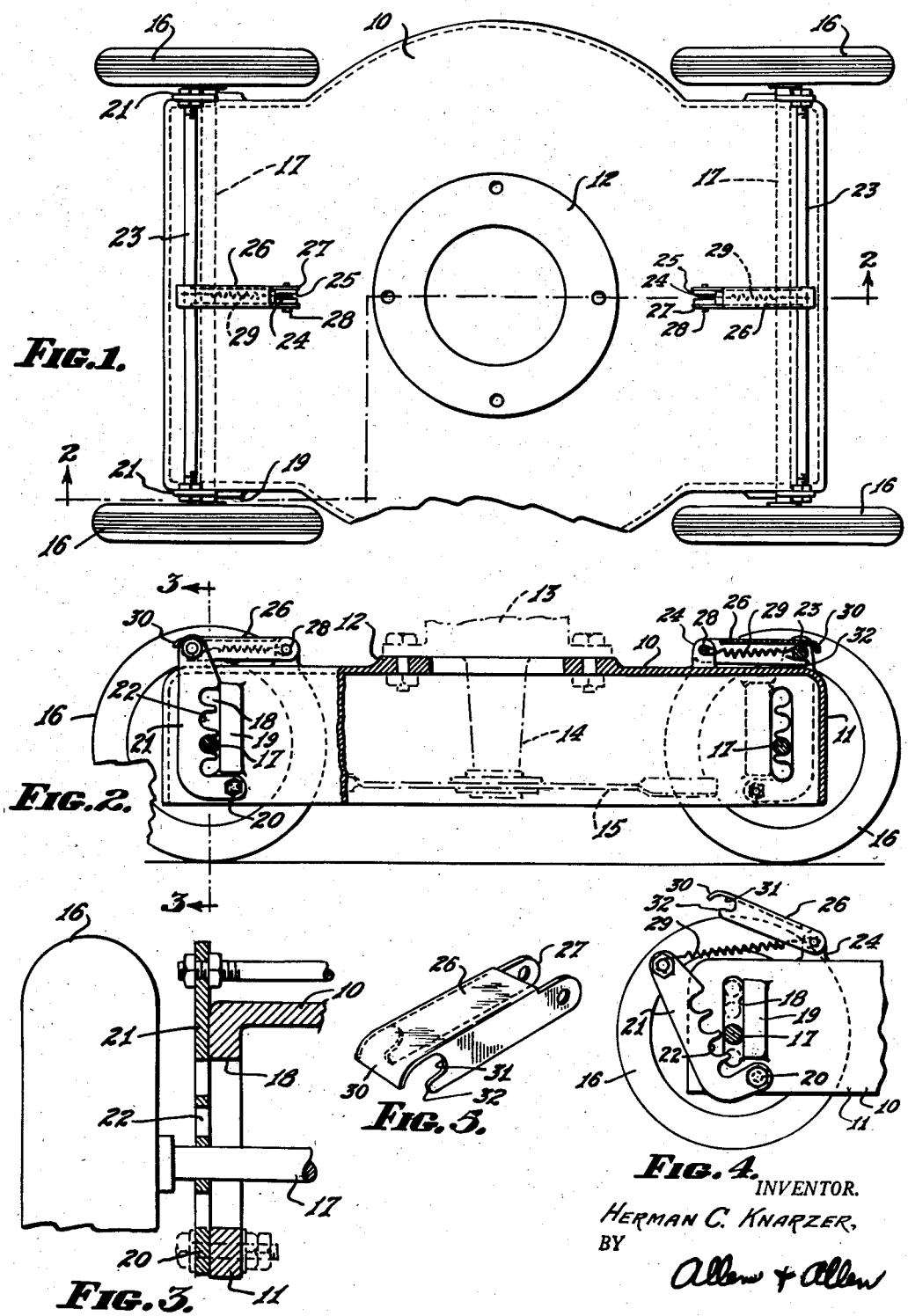
INVENTOR.
HERMAN C. KNARZER,
BY
Allen & Allen
ATTORNEYS.

United States Patent Office 2,894,761
Patented July 14, 1959

2,894,761

QUICK ADJUSTMENT MEANS FOR ROTARY LAWN MOWERS

Herman C. Knarzer, Richmond, Ind., assignor to Dille & McGuire Mfg. Co., Richmond, Ind., a corporation of Indiana Application March 25, 1957, Serial No. 648,074

8 Claims. (Cl. 280—44)

This invention resides in the provision of novel means by which the height of grass cut by a rotary lawn mower may be changed quickly.

In my Patent No. 2,728,582 which issued December 27, 1955, entitled Means for Adjusting the Height of Lawn Mower Cut and in my co-pending application filed February 8, 1957 entitled Lawn Mower Adjustment Mechanism, I have shown, described and claimed various means for shifting the housing of a rotary lawn mower, and the cutting blade carried thereby, with respect to the wheel carrying axles on which the housing is supported so as to change the height at which the lawn is cut by the mower. The instant invention, although related to these in that it is broadly designed to accomplish the same sort of thing, is specifically different.

A very important object of this invention is to provide means by which an axle carrying a pair of wheels may be quickly shifted with respect to the mower housing by an arrangement which is not only easy to use but economical to manufacture.

Another important object of this invention is to provide lawn mower adjustment means by which the height of grass cut can be changed not only quickly but with complete safety.

These and other objects of this invention will become apparent to those skilled in the art during the course of the following description and with reference to the accompanying drawings, in which drawings like numerals are employed to designate like parts and in which, Figure 1 is a top plan view with parts broken away of a rotary lawn mower to which the instant invention has been applied, Figure 2 is a section taken on the line 2—2 of Figure 1, Figure 3 is an enlarged section taken on the line 3—3 of Figure 2, Figure 4 is a fragmentary section similar to that of the left hand of Figure 2 but showing the parts in a different position, and Figure 5 is a perspective view of a latch member employed with this invention.

Referring now to the figures a rotary lawn mower is generally indicated at 10 and is shown as having a depending skirt 11. It will be understood that the mower 10 has a suitable mount 12 for a conventional motor 13. A suitable vertical drive shaft 14 depends beneath the motor and carries a cutting blade 15. The mower is supported on two pairs of wheels 16 which are mounted on axles 17. Conventional handle means, not shown, may be employed to steer the device and propel it although it is possible that the mower may be self-propelled. In any event the structure so far described is old and well known in the art and exemplary only of the type of item to which this invention is applied. Although this invention is shown as applied to a lawn mower it will be obvious to those skilled in the art that the invention may have more universal application.

The skirt 11 is provided with a vertical slot 18 adjacent each of the wheels 16. This slot is just sufficient nicely to receive the axle 17 and permit it to be moved therewithin. Preferably there is a boss formed on the skirt adjacent each of these slots as is indicated at 19 in Figures 1 and 2.

Pivoted on the outside of the skirt 11 adjacent each of the four slots 18, as indicated at 20, is a regulating arm 21 having a series of normally vertically aligned axle bearing, C-shaped recesses. Each such recess 22 will nicely receive the axle 17. The upper ends of a pair of laterally spaced members 21 are joined by a rod 23. It will be apparent that there are four members 21 and two rods 23, the arrangement for each set of members 21 and rod 23 being identical, one at the front of the lawn mower and one at the rear.

On the mower 10 is a lug 24 having a slot 25 located centrally thereof. A U-shaped latch member 26 has a pair of legs 27 adapted to straddle the lug 24 and be secured thereto pivotally by means of a pin 28 passed through such legs and the lug. A spring 29 is engaged within the slot 25 of the lug 24 at one end and is fastened to the rod 23 at the other end, such spring normally lying under the latch member 26. Within the lug 24 and its slot 25 this spring may engage the pin 28.

The forward end of the latch member 26 is provided with a downwardly curved portion 30 while the side walls are cut out to form the rod receiving recesses 31. Each side of the member 26 having a recess 31 therein also has the portion 32 which forms, with the curved portion 30, a neck through which the rod must pass in order to seat properly within the recess 31. The springs 29 normally pull the rods 23 so that the members 21 will abut the bosses 19, the latch members 26 serving to maintain the rods in this position. The axle 17 will lie within certain of the recesses 22 of the member 21 as desired.

The operation of this invention is simple. Assuming the mechanisms are located as shown in Figures 1 and 2 and assuming that one would like to change the height at which the rotating blade 15 is cutting grass, one will first grab the rod 23 while holding the lawn mower casing 10—11 adjacent a latch member 26 and pull such rod through the neck defined by the portions 30 and 32 of the member 26 so as to remove such rod 23 from the latch recess 31. This, of course, is in opposition to the spring 29. After such initial movement of the rod 23 the latch member 26 may be pivoted out of the way and the pair of members 21 connected to this particular rod 23 moved to the position indicated in Figure 4. This will remove the axle bearing recesses from the wheel carrying axle 17. The lawn mower casing 10—11 may now be lowered or raised, as desired, with the axle 17 and slot 18 having relative movement. When the mower casing has been moved to the desired position relative to the axle 17 the rod 23 is moved, as urged by the spring 29, to a position such as shown in Figure 2 whereupon the axle 17 will again be engaged within corresponding recesses 22 of a pair of the members 21. In so moving the rod to final position wherein the members 21 will bear against the bosses 19 the latch 26 is brought into position to receive the rod 23. Due to the arrangement of the portions 30 and 32 of this member 26 with respect to the recess 31, it will not be possible for the rod 23 to be jarred from the latch member by accident. It will be apparent that the pair of wheels at each end of the mower may be manipulated in the manner just described, so as to produce the desired height of cut.

It is to be understood that while this invention has been shown as embodied in certain particular structures and arrangements, these are exemplary only and the invention is not to be construed as limited to these particular structures and arrangements except insofar as they are specifically set forth in the subjoined claims. It will be apparent to those skilled in the art that modifications may be made in this invention and it is to be understood that this may be done without departing from the scope and spirit thereof.

Having thus described the invention, what is claimed as new and what is desired to be protected by United States Letters Patent is:

1. In a rotary lawn mower having a skirted housing and a pair of wheel carrying axles, the improvement which comprises: a regulating arm pivoted to the skirted housing adjacent each end of each of said axles, said skirted housing having a vertical slot adjacent each of said regulating arms to receive a said axle end, each of said regulating arms having a recess to receive a said axle end, and means to maintain said axle ends in said recesses, said last mentioned means comprising a rod connected between a pair of said regulating arms parallel to a said axle, abutments for said regulating arms, and resilient means connected between said skirted housing and said rod to hold said regulating arms against said abutments.

2. The apparatus of claim 1 in which each of said regulating arms has a plurality of said recesses which are normally vertically aligned.

3. The apparatus of claim 1 including a latch member on said housing to receive said rod.

4. Quick adjustment means for rotary lawn mowers having skirted housings and a pair of axles each carrying a pair of wheels, which comprises a member pivoted on said skirted housing adjacent each end of each of said axles, said axle ends being slidable in vertical slots provided in said skirted housing adjacent each of said pivoted members, each of said pivoted members having a plurality of axle bearing recesses, and means to maintain said axle ends in selected axle bearing recesses, said last mentioned means including a rod connected between a pair of said pivoted members parallel to said axles, abutments for said pivoted members, spring means connected between said skirted housing and said rods to urge a pair of said pivoted members against said abutments, and latch means between said skirted housing and said rod to prevent accidental displacement of said rod.

5. The quick adjustment means of claim 4 in which said axle bearing recesses are normally vertically aligned, said pivoted members being movable against the action of said spring means upon release of said latch means to remove said axle bearing recesses from said axle ends whereupon said axle ends may have relative sliding movement to said skirted housing in said vertical slots.

6. The quick adjustment means of claim 5 in which said latch means comprises a latch member pivoted to said skirted housing and having a necked recess to receive said rod.

7. The quick adjustment means of claim 6 in which said spring means normally lies within said latch means.

8. The quick adjustment means of claim 7 in which there is a slotted lug on said skirted housing, said latch member being of inverted U-shape in cross section and having a pair of legs pivoted to and straddling said lug, said spring means being connected within the slotted lug and extending beneath said latch member.

References Cited in the file of this patent

UNITED STATES PATENTS

| | | |
|---|---|---|
| 1,137,993 | McCarthy | May 4, 1915 |
| 2,708,119 | Best | May 10, 1955 |
| 2,728,582 | Knarzer | Dec. 27, 1955 |
| 2,831,697 | Phelps | Apr. 22, 1958 |